United States Patent [19]

Koike

[11] 4,389,845

[45] Jun. 28, 1983

[54] TURBINE CASING FOR TURBOCHARGERS

[75] Inventor: Takaaki Koike, Hachioji, Japan

[73] Assignee: Ishikawajima-Harima Jukogyo Kabushiki Kaisha, Tokyo, Japan

[21] Appl. No.: 189,369

[22] Filed: Sep. 22, 1980

[30] Foreign Application Priority Data

Nov. 20, 1979 [JP] Japan .............................. 54-161014[U]
Feb. 13, 1980 [JP] Japan .................................. 55-16416
Feb. 20, 1980 [JP] Japan .................................. 55-20217

[51] Int. Cl.³ .......................... F02D 23/00; F01D 25/24
[52] U.S. Cl. ...................................... 60/602; 415/145; 415/205
[58] Field of Search ................. 60/602, 600, 601, 603; 415/205, 145, 151, 204, 605

[56] References Cited

U.S. PATENT DOCUMENTS 3,313,518 4/1967 Nancarrow .......................... 415/205
3,557,549 1/1971 Webster ................................ 60/602

FOREIGN PATENT DOCUMENTS 1949484 11/1966 Fed. Rep. of Germany ...... 415/205
1044176 9/1966 United Kingdom .
1426554 3/1976 United Kingdom .................. 60/602

Primary Examiner—Douglas Hart
Attorney, Agent, or Firm—B. B. Olive

[57] ABSTRACT

A turbine casing for turbochargers adapted for use with reciprocating internal combustion engines, in which in response to the flow rate of the exhaust gases from an engine, the exhaust gases are directed to flow through a first or radially inward scroll divided into two or more exhaust gas passages in the axial direction of a turbine wheel or through said first or radially inward scroll and a second or radially outward scroll, whereby regardless of the variations in flow rate an optimum supercharging efficiency can be maintained over the whole region of operating conditions of the engine.

1 Claim, 21 Drawing Figures

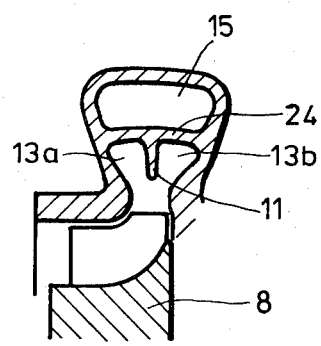
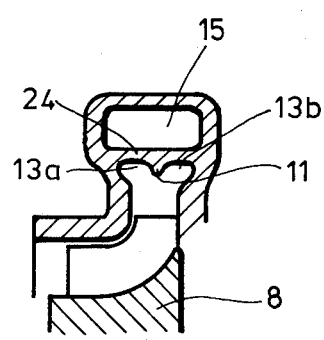
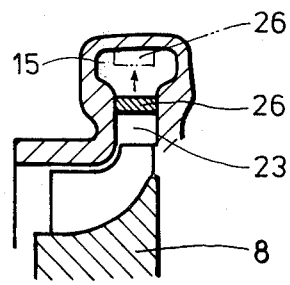

TURBINE CASING FOR TURBOCHARGERS

BACKGROUND OF THE INVENTION

Reciprocating internal combustion engines have been equipped with turbochargers. The turbine of a turbocharger is driven by the energy of exhaust gases discharged from an internal combustion engine so that the rotating force is developed for driving the blower which is coaxial with the turbine. The blower compresses the air and the compressed air is directed to the intake system of the engine so that the output may be increased.

The prior art supercharging systems are shown in FIGS. 1 through 3 in which the same reference letters are used to designate similar parts.

The supercharging system shown in FIG. 1 has been widely used. The exhaust gases from an engine a flows through an exhaust pipe d to a turbine b and expands in the turbine b so that work is done and a blower c spins. The blower c discharges the compressed air which in turn is charged through an intake passage e to the engine a. In the supercharging system of the type described above, the turbine casing is of the fixed nozzle type so that from the standpoint of the strength of the engine a, the supercharging pressure is limited to a certain level. As a result, the turbocharger is so designed that a matching point is reached at high speeds. The use of the turbocharger in other speed regions results in insufficient boost or air volume so that the engine performance drops.

In the prior art supercharging system of the type shown in FIG. 2, in order to overcome the defects of the supercharging system described in conjunction with FIG. 1, the matching point between the engine a and the supercharging system is selected at low and medium speeds. When the flow rate of exhaust gases inreases and subsequently the supercharging pressure rises too high at high speeds, part of the exhaust gases are discharged into the surrounding atmosphere through a bypass passage g which is interconnected between the inlet and outlet of the turbine b so as to bypass it and has a waste gate f, whereby the damages to the engine a due to the excessive boost at high speeds can be avoided. With this system, the exhaust gases are discharged into the surrounding atmosphere by bypassing the turbine b, so that the energy losses are high and the engine performance drops at high speeds.

The prior art supercharging system shown in FIG. 3 is equipped with vane nozzles h adapted to adjust the gas inlet angle so that a constant degree of boost can be maintained without causing the exhaust gases to bypass the turbine b. The system for controlling the angle of the vane nozzles h is very complex in construction so that the supercharging system becomes very expensive. In order to overcome this defect, there has been proposed a system in which scrolls of vaneless nozzles are switched. However, this system generally becomes the static pressure type, so that it becomes impossible to utilize low-velocity pulses. In addition, exhaust interference results so that the engine performance drops.

In general, multi-cylinder reciprocating internal combustion engines equipped with turbochargers are easily susceptible to exhaust interference. So, upon defining an exhaust manifold, care must be taken so as not to drop the engine performance. In order to overcome this problem, which occurs especially when the boost is lower than the exhaust gas pressure or the engine is partially loaded, there has been proposed a supercharging system in which the exhaust manifold to the turbine wheel is divided into two or more branches so that cylinders in adjacent explosion order will not exhaust into the same branch and consequently the exhaust interference can be avoided.

According to the present invention, in order to avoid exhaust interference in a scroll when a vaneless variable nozzle is used, the exhaust gases from the engine are directed to flow toward the turbine wheel through a first or radially inward scroll which is substantially divided into two passages in the axial direction of the turbine wheel, whereby the effective utilization of exhaust pulses can be insured. When the flow rate becomes high at high rotational speeds, the pulsations of exhaust gases are reduced and the flow of the exhaust gases reaches almost the steady state. In addition, the boost pressure becomes higher than the exhaust gas pressure. As a result, the adverse effects of exhaust interference are reduced. Therefore, according to the present invention, the use of a second or radially outward scroll defining a single passage throughout its whole length and therefore exhibiting less resistance to the flow of the exhaust gases is very advantageous from the standpoint of turbine efficiency. Thus, the turbine casing in accordance with the present invention is provided with the second or radially outward scroll in addition to the first or radially inward scroll so that when the flow rate of the exhaust gases from the engine becomes high, the gases are automatically directed to flow into not only the first or radially inward scroll but also into the second or radially outward scroll. In other words, the scroll in the turbine casing is increased in volume. In addition, the first and second scrolls are so combined as to coact in such a way that no drop in turbine efficiency will occur under any operating conditions of the engine.

The primary object of the present invention is therefore to provide a turbine casing for turbochargers which is very simple in construction yet capable of maintaining the supercharging efficiency at a predetermined level and utilizing the energy of the exhaust gases regardless of the variation from a low flow rate to a high flow rate of the exhaust gases as the speed of the engine varies from a low speed to a high speed.

Another object of the present invention is to provide a scroll structure which can provide a scroll adapted for a low flow rate when the flow rate of the exhaust gases is low and the pulsations of the exhaust gases is high, but provides a scroll having a large cross section in addition to the first-mentioned scroll when the flow rate of the exhaust gases is high and consequently the steady flow is reached.

The present invention will become more apparent from the following description of some preferred embodiments thereof taken in conjunction with the accompanying drawings.

BRIEF EXPLANATION OF THE DRAWINGS

FIG. 19 is a cross sectional view looking in the direction J of FIG. 18;

FIG. 20 is a cross sectional view looking in the direction K of FIG. 18; and

FIG. 21 is a cross sectional view looking in the direction L of FIG. 18.

The same reference numerals are used to designate similar parts throughout the figures.

DETAILED DESCRIPTION OF THE PREFERRED EMBODIMENTS

Figure 1:
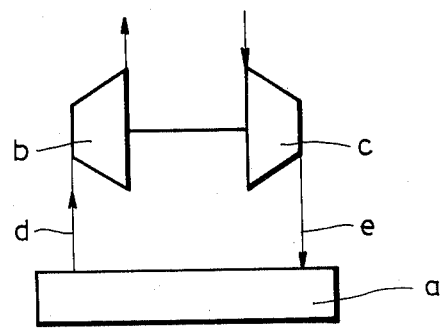
FIGS. 1 through 3 show the prior art supercharging system, respectively.
Figure 2:
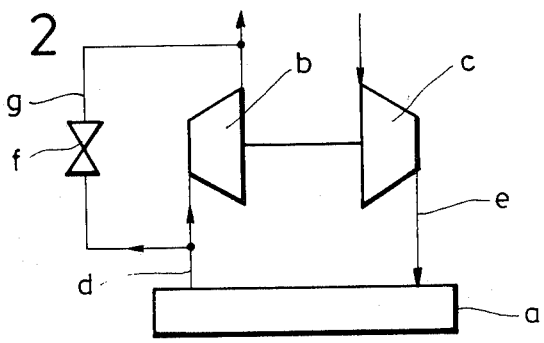
Figure 3:
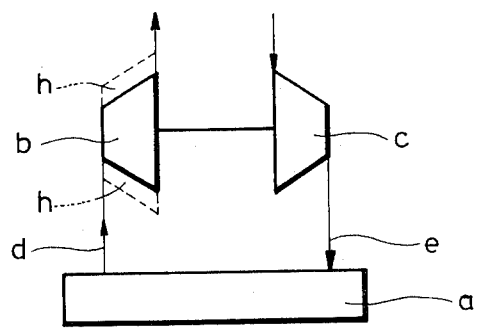
Figure 4:
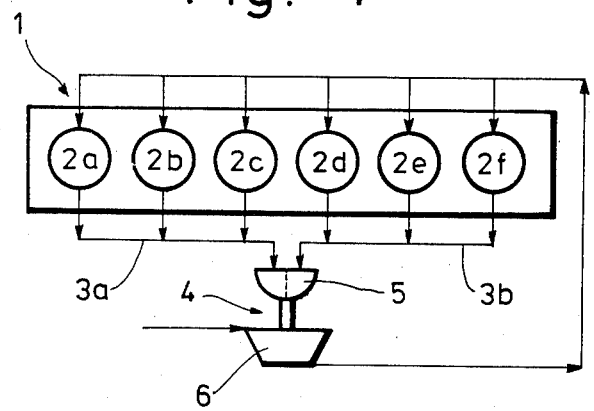
FIG. 4 is a diagrammatic view used for the explanation of a six-cylinder engine with a turbocharger.

Referring first to FIG. 4, in order to avoid exhaust interference, cylinders 2a through 2c of an engine 1 exhaust into a first exhaust pipe 3a while the cylinders 2d through 2f exhaust into a second exhaust pipe 3b. The exhaust gases flow through the first and second exhaust pipes 3a and 3b into a turbine casing 5 of turbochargers 4 so that the rotation of the turbine wheel 8 drives a blower 6 which is coaxial with the turbine. Air 7 is compressed in and discharged from the blower 6 and is charged into the cylinders 2a through 2f.

First Embodiment, FIGS. 5 through 10

Figure 5:
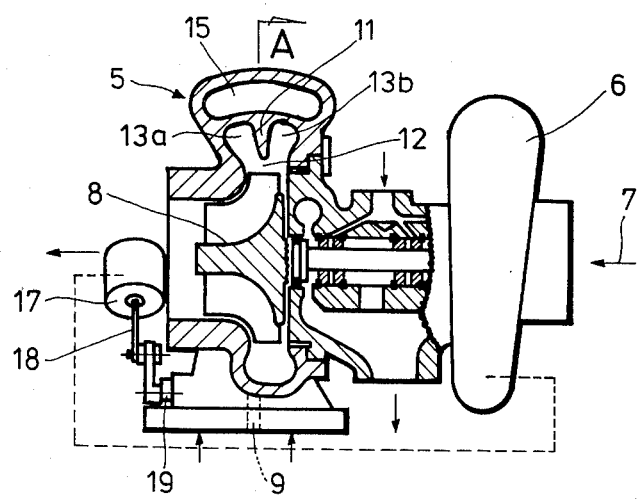
FIG. 5 is a cross sectional view of a first embodiment of a turbine casing of a turbocharger in accordance with the present invention.
Figure 8:
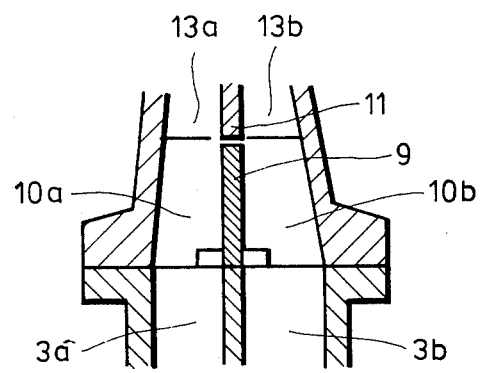
FIG. 8 is a cross sectional view looking in the direction C of FIG. 6.
Figure 9:
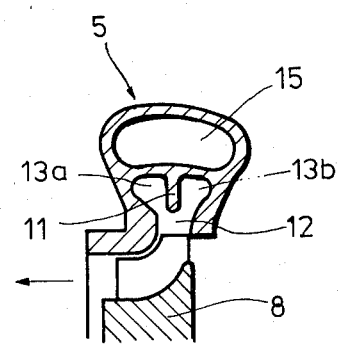
FIG. 9 is a cross sectional view looking in the direction D of FIG. 6.
Figure 10:
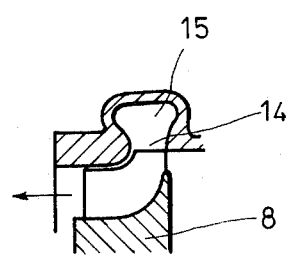
FIG. 10 is a cross sectional view looking in the direction E of FIG. 6.

The turbine casing 5 is provided with a first gas inlet 10a and a second gas inlet 10b which are separated by a partition wall 9 in the axial direction of a turbine wheel 8 and are connected to the first and second exhaust pipes 3a and 3b, respectively, as best shown n FIG. 8. The first and second gas inlets 10a and 10b are communicated with first scrolls 13a and 13b, respectively, which are substantially divided by a partition wall 11 and which direct the exhaust gases toward a first nozzle portion 12 which opens at the periphery of the turbine wheel 8 as best shown in FIG. 5. A second scroll 15 with a single passage surrounds the first scrolls 13a and 13b and is communicated with both the first and second gas inlets 10a and 10b so that the exhaust gases from them are combined and directed to a second nozzle portion 14 opened at the periphery of the turbine wheel 8.

The first scrolls 13a and 13b are used when the gas flow rate is low. When the engine is partially loaded; that is, when the engine is fed with a small amount of fuel, the gas flow is low and the effective energy is low. However, even when the flow rate is low, the supercharging efficiency must be maintained at a predetermined level. To this end, the center angle $\alpha$ of the first nozzle portion 12 of the first scrolls 13a and 13b is about 180° as shown in FIG. 6 to reduce pumping loss, because the second scroll 15 is empty when the flow rate of the exhaust gases flowing through the separated scrolls 13a and 13b is low.

A control valve means 16 (See FIG. 6) is provided adjacent to the first and second gas inlets 10a and 10b so that the exhaust gases can flow only through the first scrolls 13a and 13b or both through the first scrolls 13a and 13b and the second scroll 15. As shown in FIG. 6, a stem 19 of the control valve means 16 is operatively connected through a linkage 18 to a control unit 17 which consists of a diaphragm, which is deflected in response to the boost pressure, and a bias spring. Therefore, in response to the boost pressure, the control valve means 16 is so operated as to close or open the second scroll 15. More specifically, when the engine 1 is running at low or medium speeds or is partially loaded, the flow rate of the exhaust gases is low so that the boost pressure is low. Therefore the control unit 17 so operates as to close the second scroll 15 as indicated by the solid lines in FIG. 6. As a result, the exhaust gases flow into the first scrolls 13a and 13b only. Since the first scrolls 13a and 13b are substantially separated from each other, no exhaust interference results. In addition, the pulsations of the exhaust gases can be utilized very effectively. When the second scroll 15 is closed by the control valve means 16, the cross sectional area of the scroll structure is less than that when the second scroll 15 is opened, so that the velocity of the exhaust gases flowing through the first scrolls 13a and 13b is increased, whereby the sufficiently high boost pressure is attained.

When the engine 1 is running at high speeds, the flow rate of the exhaust gases increases, so that the control unit 11 causes the control valve means 16 to open the second scroll 15 and consequently the overall cross sectional area of the scroll structure increases. The exhaust gases flowing from the separate gas inlets 10a and 10b are mixed or diffused in the second scroll 15 downstream of the control valve means 16. Since the second scroll 15 exhibits less resistance to the flow of the exhaust gases, the boost pressure can be maintained at a predetermined level or magnitude.

Figure 6:
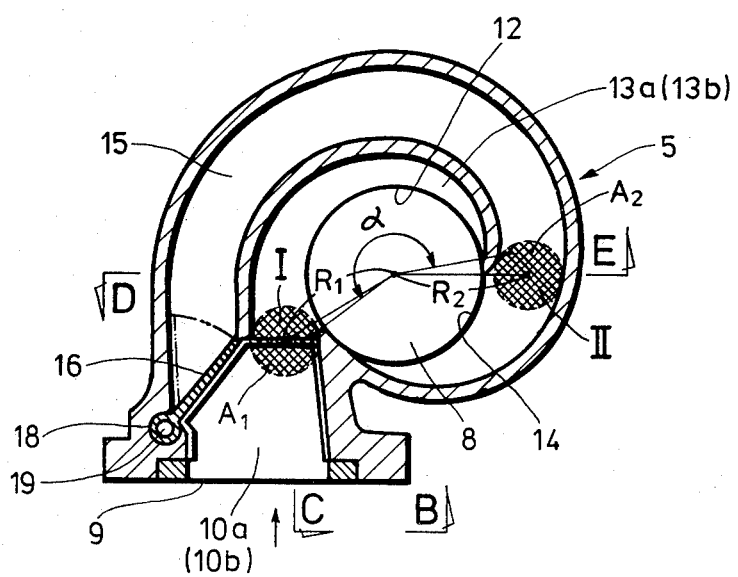
FIG. 6 is a cross sectional view looking in the direction A of FIG. 5.
Figure 7:
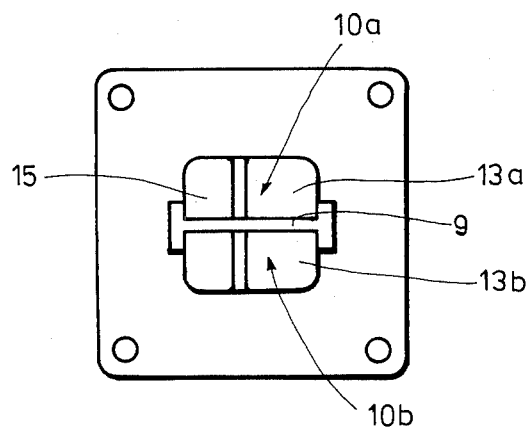
FIG. 7 is a bottom view looking in the direction B of FIG. 6.

In FIG. 6, reference letter $A_1$ denotes the cross-sectional area of the scroll inlet at the portion I of the first scrolls 10a and 10b; $A_2$, the cross-sectional area of the scroll inlet at the portion II of the second scroll 15; $R_1$, the radius of the flow passage at the portion I; and $R_2$, the radius of the flow passage at the portion II. The value $A_1/R_1$ at the portion I, the value $A_2/R_2$ at the portion II and the openings in terms of the center angles $\alpha$ and $(360-\alpha)$ of the first and second nozzle portions 12 and 14 are so determined that when the control valve means 16 is wide open, uniform flows of the exhaust gases can be obtained. The ratios between them can be selected arbitrarily depending upon a desired matching between the engine and the turbocharger (in general, the matching point being at a medium speed), but an optimum performance can be attained when the opening of the first nozzle portion 12 is greater than 180°. The value $A_1/R_1$ of the first scrolls 10a and 10b and the value $A_2/R_2$ of the second scroll 15 are correlated by the following expression:

$$\frac{A_1/R_1}{\beta_1 \times \alpha} = \frac{A_2/R_2}{(360-\alpha)\beta_2}$$

where $\beta_1$ = the pulsation utilization ratio in the first scrolls 13a and 13b, the ratio being from 1.1 to 1.2, and $\beta_2$ = the pulsation utilization ratio in the second scroll 15, the ratio being on the order of 1.0.

Figure 11:
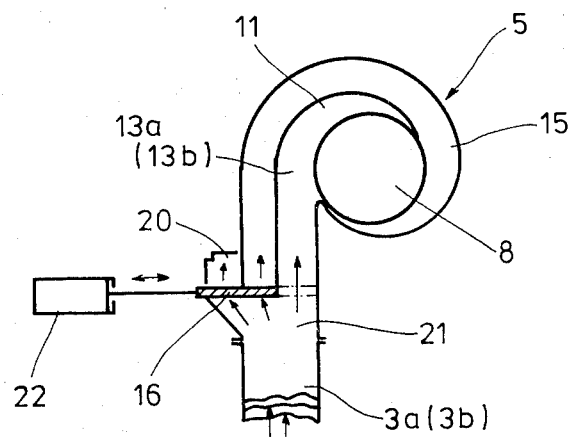
FIG. 11 is a schematic front view of a second embodiment of the present invention which is equipped with an outlet for discharging the exhaust gases to the surrounding atmosphere.

Second Embodiment, FIG. 11

The second embodiment shown in FIG. 11 is so designed and constructed that when the flow rate of the exhaust gases increases with increase in speed of the engine 1, part of the exhaust gases are directly discharged into the surrounding atmosphere so that stable turbine characteristics can be insured. In this embodiment, the optimum supercharging efficiency can be obtained with the exhaust gases whose flow rate is lower than that in the first embodiment. The second embodiment is substantially similar in construction to the first embodiment previously described with reference to FIGS. 4 through 10 except that the first scrolls 13a and 13b, the second scroll 15 and a waste gate 20 are communicated with the first and second exhaust pipes 3a and 3b through a turbine inlet or a connector 21 and the control valve means 16 is so arranged as to selectively open or close the first scrolls 13a and 13b, the second scroll 15 and the waste gate 20. In the second embodiment, the control valve means 16 is shown as comprising a slide valve operatively connected to an actuator 22. However, instead of a slide valve, a butterfly valve may also be employed as with the first embodiment.

When the flow rate of the exhaust gases is low, the control valve means 16 is positioned as shown so that the exhaust gases flow only through the first scrolls 13a and 13b. As with the first embodiment, the overall cross sectional area of the scroll structure is small, so that the velocity of the exhaust gases flowing through the first scrolls 13a and 13b is increased. In addition, as previously described in conjunction with the first embodiment, the first scrolls 13a and 13b are substantially separated by the partition wall 11 so that the pulsations of the exhaust gases can be utilized at high efficiency and consequently a sufficiently high boost pressure can be insured even at low speeds.

When the flow rate of the exhaust gases increases, the actuator 22 so operates as to cause the slide valve 16 to open not only the first scrolls 13a and 13b but also the second scroll 15. As a result, the volume of the turbine casing 5 is increased so that the velocity of the exhaust gases decreases and consequently the boost pressure can be maintained at a predetermined level. When the speed of the engine 1 further increases, the flow rate of the exhaust gases increases accordingly so that the actuator 22 causes the slide valve 16 to open not only the first and second scrolls 13a, 13b and 15 but also the waste gate 20. As a result, part of the exhaust gases from the engine 1 is discharged into the surrounding atmosphere so that the boost pressure can be prevented from rising excessively and maintained at an optimum level.

In summary, according to the second embodiment, the first scrolls 13a and 13b, the second scroll 15 and the waste gate 20 are selectively opened or closed in response to the flow rate of the exhaust gases from the engine 1 so that regardless of the variations in flow rate, the desired turbine characteristics can be maintained.

Third Embodiment, FIGS. 12 through 16

Figure 12:
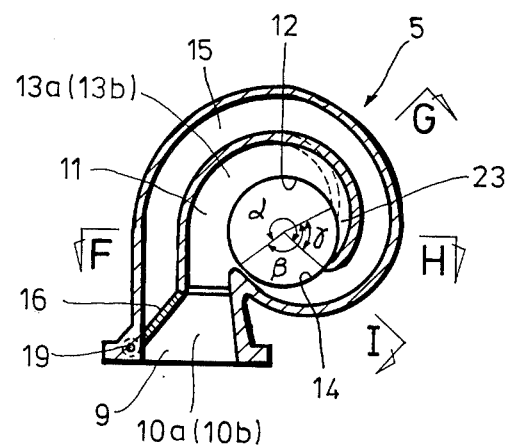
FIG. 12 is a front view in cross section of a third embodiment of the present invention in which a first scroll and a second scroll are intercommunicated.
Figure 13:
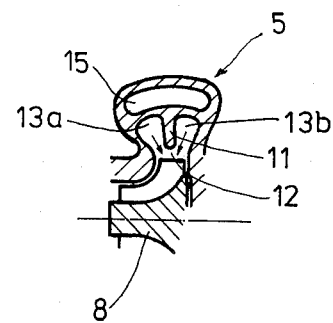
FIG. 13 is a cross sectional view looking in the direction F of FIG. 12.
Figure 14:
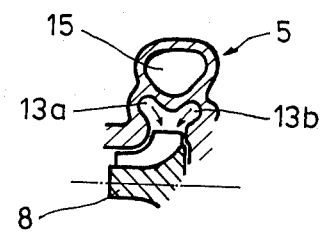
FIG. 14 is a cross sectional view looking in the direction G of FIG. 2.
Figure 15:
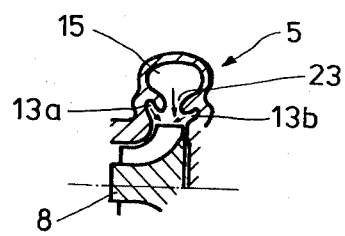
FIG. 15 is a cross sectional view looking in the direction H of FIG. 12.
Figure 16:
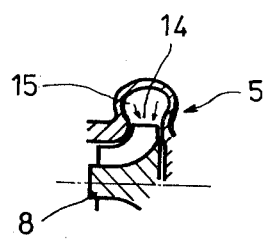
FIG. 16 is a cross sectional view looking in the direction I of FIG. 12.

The third embodiment of the present invention to be described in detail with reference to FIGS. 12 through 16 is substantially similar in construction to the first embodiment except that the first scrolls 13a and 13b are partly communicated with the second scroll 15. In this embodiment, the pumping loss can be minimized and the turbine efficiency at the low gas flow rate can be increased. According to the third embodiment, the opening in terms of the center angle $\alpha$ of the first nozzle portion 12 and the opening in terms of the center angle $\beta$ of the second nozzle portion 14 are so selected that the following relationship can be held:

$$\alpha + \beta = 360° + \gamma$$

where $\gamma$ = the center angle of an opening 23 partially intercommunicating between the first scrolls 13a and 13b and the second scroll 15 (See FIGS. 12 and 15).

As best shown in FIG. 15, the opening 23 is so selected that three streams of the exhaust gases from the first scrolls 13a and 13b and the second scroll 15 can flow into the turbine wheel 8 as indicated by the arrows in FIG. 15.

In order to attain a high turbine efficiency, it is very important that the scroll structure is so designed and constructed that the exhaust gases enter the turbine wheel 8 from the whole periphery thereof. In the case of radial turbines, the opening in terms of the center angle of the nozzle portion of the scroll is limited to 360°, so that when the flow rate of the exhaust gases is low, the opening of the first scrolls 13a and 13b to the turbine wheel 8 is narrow; that is, the partial admission results. As a result, the turbine efficiency drops. However, according to the third embodiment, the first and second scrolls 13a, 13b and 15 are intercommunicated through the opening 23 so that the openings (in terms of the center angle) of both the first and second nozzle portions 12 and 14 can be increased as compared with the first or second embodiment. As a result, a desired turbine efficiency can be maintained over a wider operating range of the engine 1.

Fourth Embodiment, FIGS. 17 through 21

The fourth embodiment to be described in detail below with reference to FIGS. 17 through 21 is substantially similar in construction to the third embodiment previously described except that a leading end portion 26 of the partition wall 24 between the first scrolls 13a and 13b on the one hand and the second scroll 15 on the other hand is so arranged as to selectively open or close the opening 23. More specifically, the leading end portion or movable wall 26 is pivoted with a pivot pin 25 adjacent to the gas inlets 10a and 10b in such a way that the movable wall 26 swings radially inwardly so as to close the opening 23 between the first and second scrolls 13a, 13b and 15 or it swings radially outwardly until the tip of the movable wall 26 bears against the radially outward wall of the second scroll 15 as indicated by the two-dot chain line in FIG. 18 so that the first and second scrolls 13a, 13b and 15 are intercommunicated with each other.

Figure 17:
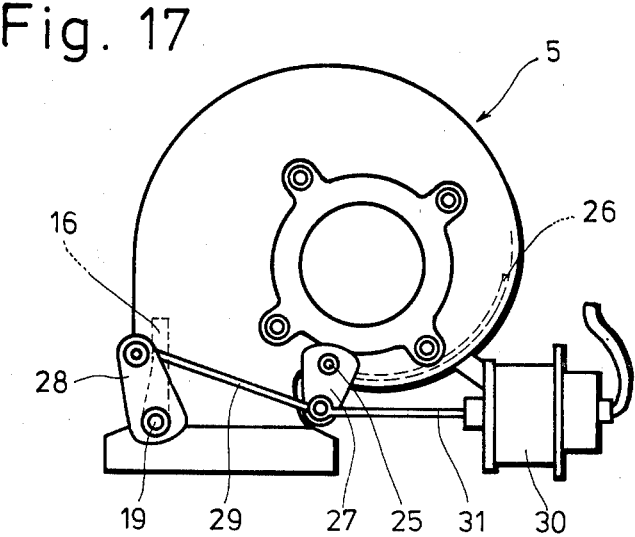
FIG. 17 is a front view of a fourth embodiment of the present invention which is substantially similar to the third embodiment except that a hinged door is disposed between two scrolls.

In order to operate the movable wall 26 in unison with the control valve means 16, cranks 27 and 28 are attached to the pivot pin 25 and the valve stem 19, respectively, as shown in FIG. 17 and are interconnected with a control rod 29. The crank 27 is connected through a control rod 31 to an actuator 30 which operates when the flow rate of the exhaust gases exceeds a predetermined level. The control valve means 16 and the movable wall 26 are thus simultaneously operable.

Figure 18:
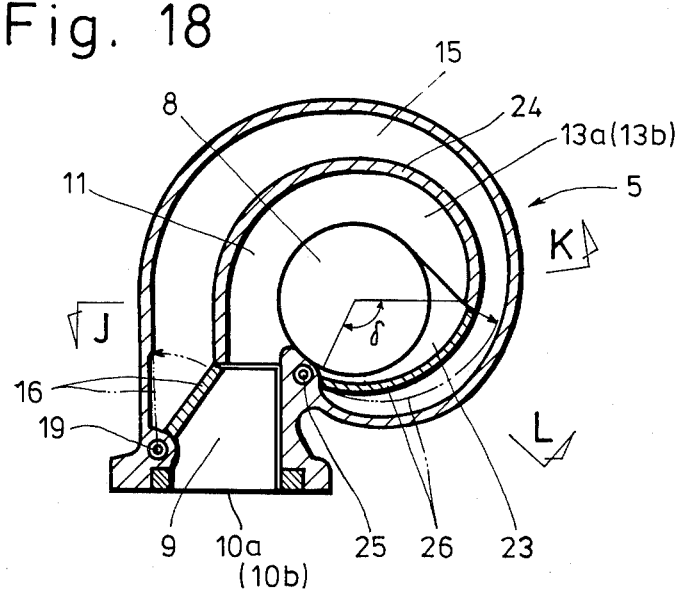
FIG. 18 is a front view in cross section thereof.

When the flow rate of the exhaust gases from the engine 1 is low, the control valve means 16 and the movable wall 26 are positioned as indicated by the solid lines in FIG. 18. As a result, the second scroll 15 is closed and the opening 23 between the first and second scrolls 13a, 13b and 15 are also closed so that the exhaust gases flow through the first scrolls 13a and 13b and are admitted into the turbine wheel 8 from the whole periphery thereof. As a consequence, even when the flow rate of the exhaust gases is low, pumping loss can be minimized while maintaining a high turbine efficiency.

When the flow rate exceeds a predetermined level, the actuator 30 is operated so that the control rod 31 is extended to cause the control valve means 16 and the movable wall 26 to retract to the positions indicated by the two-dot chain lines in FIG. 18. As a result, the exhaust gases flow also into the second scroll 15 from the gas inlets 10a and 10b so that the resistance to the flow of the exhaust gases is reduced. The exhaust gases flow through the second scroll 15 and the opening 23 and combine with the exhaust gases flowing through the first scrolls 13a and 13b and are admitted into the turbine wheel 8. When the second scroll 15 is opened in the manner described above, the turbine casing 5 is increased in volume so that the boost pressure can be maintained at a predetermined level. The length in terms of the center angle δ subtended by the arcuate movable door 26 may be suitably selected depending upon the desired timing at which the movable wall 26 is opened or upon the operating conditions of the engine 1.

It is to be understood that the present invention is not limited to the embodiments described above and that various modifications can be made. For instance, the present invention can be applied to various turbochargers for reciprocating internal combustion engines. Instead of the control valve means shown, any suitable valves such as butterfly valves, slide gate valves, rotary valves and so on can be used. The control valve means 16 and the movable wall 26 may be so arranged that they operate independently of each other. They are also so arranged that they operate in response to the exhaust gas pressure, the boost pressure or the rotational speed of the engine or the turbocharger.

In summary, according to the present invention, an optimum scroll configuration can be established in response to the flow rate of the exhaust gases from the engine so that regardless of the variations in flow rate, a predetermined supercharging efficiency can be maintained all the time and consequently the reliability of the turbocharger can be considerably improved.

What is claimed is:

1. A turbine casing for turbochargers having a turbine wheel, comprising:
(a) a first radially inward casing wall having an appended integral centrally positioned partition wall extending radially inward therefrom, said casing wall with said partition wall being formed to establish a first radially inward partially divided scroll surrounding substantially half of the periphery of the turbine wheel for service as first and second side-by-side exhaust passages in the axial direction of the shaft of said turbine wheel so that separate flows of exhaust gases from an engine may be directed through respective said passages to the portion of said turbine wheel surrounded by said first scroll;
(b) a second radially outward casing wall formed integral with and surrounding the entirety of said first casing wall, said second casing wall being formed to establish a second scroll located radially outward from said first scroll and utilizing said first casing wall as a portion of the boundary thereof, said second scroll being separated from and surrounding a major portion of said first scroll and having a terminal portion surrounding a further minor portion of the periphery of said turbine wheel additional to the portion surrounded by said first scroll, said second scroll thereby being adapted for service as a third exhaust passage surrounding and separated from said first and second exhaust passages so that a separate flow of exhaust gases from an engine may be directed through said third passage to said minor portion of said turbine wheel surrounded by said second scroll;
(c) casing structure formed integral with said first and second casing walls and providing a common inlet to said first and second scrolls for exhaust gases from an engine; and
(d) control valve means for selectively controlling the flow of the exhaust gases from said inlet to said second scroll while maintaining the flow of such gases to said first scroll.

* * * * *